Dec. 1, 1925.
C. STANEK
DRAWBAR FOR HARROWS
Filed April 7, 1924
1,563,878
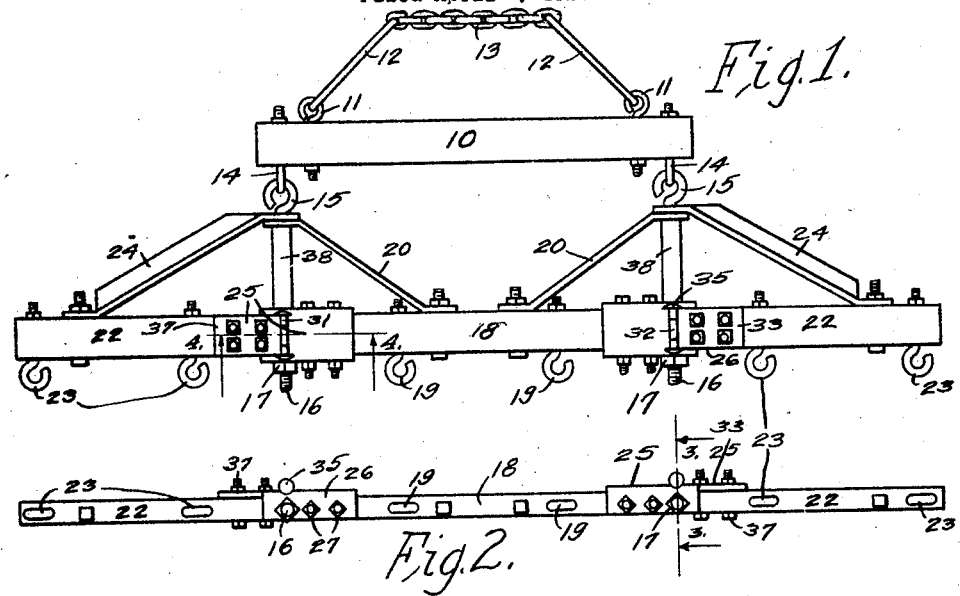
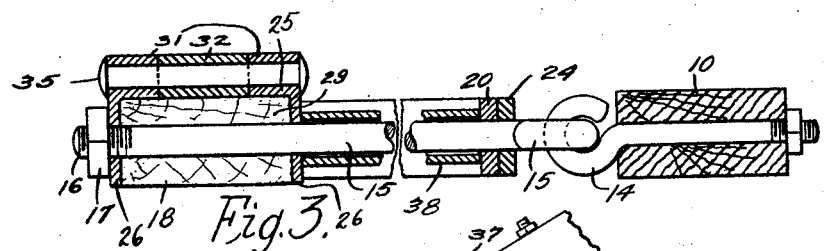
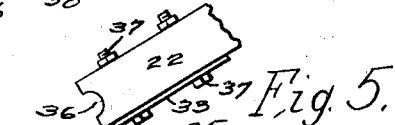
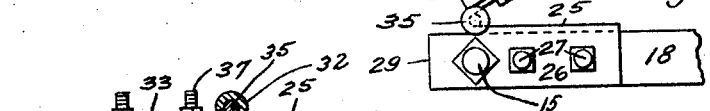
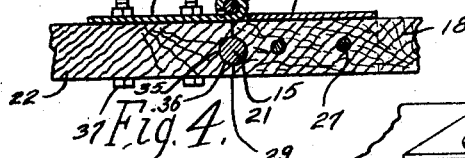
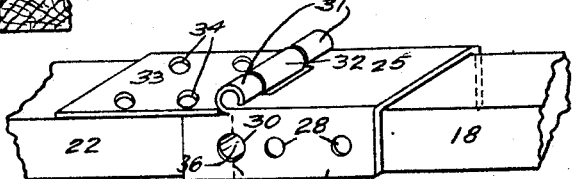
INVENTOR
Charles Stanek
BY Baird & Freeman
ATTORNEYS
WITNESS
L.F.Larsh.

Patented Dec. 1, 1925.

1,563,878

UNITED STATES PATENT OFFICE.

CHARLES STANEK, OF ORIENT, IOWA.

DRAWBAR FOR HARROWS.

Application filed April 7, 1924. Serial No. 704,745.

*To all whom it may concern:*

Be it known that I, CHARLES STANEK, a citizen of the United States, residing at Orient, in the county of Adair and State of Iowa, have invented a certain new and useful Drawbar for Harrows, of which the following is a specification.

The object of my invention is to provide a draw bar for harrows or the like arranged in sections so that when driving through a gate of less width than the width of the sections of harrows, then one section may be swung over and positioned upon one of the other sections for permitting the sections of harrows to pass through the gate.

Still a further object is to provide a hinge connection between two adjacent members of the draw bar wherein one member may be swung upon the other member when desired and when in operative position, the abutting ends of the members will have a draw rod or bolt partially received in each of the abutting ends of the members.

Still a further object is to provide a socket hinge structure through which the draw rod passes and into which one of the members is received for securely holding the members in proper operative position.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a top, plan view of my improved draw bar for harrows, which in this case is shown for use with three sections of harrows.

Figure 2 is a side view of the draw bar for harrows.

Figure 3 is a sectional view taken on line 3—3 of Figure 2.

Figure 4 is a detail, sectional view taken on line 4—4 of Figure 1, showing the hinged connection in section.

Figure 5 is a detail, sectional view of one of the hinge members showing how one section or member may be swung over upon the adjacent member; and Figure 6 is a detail, perspective view of the hinge connection between the adjacent members of the draw bars.

In the accompanying drawings I have used the reference numeral 10 to indicate generally a bar or member which has fixed to it near its ends, a pair of eyebolts 11.

The eyebolts 11 in turn have secured thereto, links 12 which extend toward each other and are connected to a chain 13. The chain 13 may either be connected to a tractor or to the double tree of a team of horses.

The ends of the bar 10 have mounted therein, eyebolts 14, which in turn are connected to draw rods 15, which draw rods are of considerable length and have their rear ends screw threaded, as at 16, for receiving the nuts 17.

A center member 18 has mounted in it a pair of eyebolts 19 to which may be connected the center section of a three section harrow.

Braces 20 are bolted to the center member 18 and have their ends extended in opposite directions for permitting the draw bars 15 to pass therethrough. The ends of the section 18 are formed with notches 21 which receive substantially one-half of the draw bars 15.

Members 22 are hingedly secured to the ends of the member 18, as will hereinafter be described. Each of the members 22 are provided with eye bolts 23 for permitting the end sections of a three section harrow to be secured thereto.

Braces 24 are bolted to the members 22 and have their ends bent toward each other so that each one of them may receive a draw rod 15, as clearly shown in Figure 1 of the drawings. The braces 24 are preferably formed of angle irons, as clearly shown in Figure 1 of the drawings.

The hinge connection between the center member 18 and the outside members 22 is clearly shown in Figure 6 of the drawings and consists of a socket 25, which forms one-half the hinge connection.

The socket member 25 has downturned flanges 26 through which are extended bolts 27. The downturned flanges 26 have openings 28 formed therein for permitting the bolts 27 to extend therethrough and through the center member 18. The downturned flanges 26 of the socket members 25 extend beyond the ends of the center member 18.

The length of the center member 18 is shown by the dotted lines 29 in Figure 6 of the drawings. The downturned flanges 26 are also formed with openings 30 through which are extended the draw rods 15.

The upper side of the socket 25 is formed with a pair of spaced rolled ears 31 which receive therebetween the rolled ear 32 of a plate 33.

The plate 33 is provided with a number of openings 34 and rests upon the upper side of the end members 22.

The plate 33 forms, together with a socket member 25, a complete hinge for the end members 22 and the center member 18, after a pintle rod 35 is inserted in the rolled ears 31 and 32.

Bolts 37 are employed for connecting the plates 33 to the members 22.

The ends of the members 22, which abut against the ends of the member 18 are formed with notches 36 substantially the same size as the notches 21 and when the ends abut each other, a complete opening is formed, which is substantially the same size as the rod 15.

The members 22 when received in the socket members 25, will be securely received therein so that when the complete draw bar is used, the end members 22 will be sufficiently braced for carrying out their purpose.

In order to retain the braces 20 and 24 against sliding movement on the draw rods 15, I place a sleeve 38 on each of the draw rods 15, which is received between one of the flanges 26 of the sockets 25 and the braces 20 and 24, as clearly shown in Figure 1 of the drawings.

From the construction of the parts just described, it will be seen that either one of the members 22 which has secured to it a section of a harrow, can be swung upon the hinge structure and brought to position where it will rest substantially upon the center member 18 and for permitting the three row harrow section to be taken through a gate of less width than the three row harrow section.

The brace members 24 are pivotally connected to the draw rods 15, which permits the swinging or hinged movement of the members 22, as hereinbefore described.

Either of the end members 22 may be swung depending upon the gate desired to take the harrow through.

It may be mentioned that my structure can be conveniently used with a four section harrow, by simply lengthening out the center member 18, and in that connection, both of the end members 22 may be swung to position where they will rest upon the center member 18. As shown in the drawings, however, it is only necessary to swing one of the end members 22 where it will rest upon the member 18.

It will be further noted that the line of pull, which is on the draw rods 15, will come right at the connection between the end members 22 and the center member 18, thereby giving me a very efficient structure.

Some changes may be made in the construction and arrangement of the various parts of my invention, without departing from the real spirit and purpose of my invention and it is my intention to cover by my claims, any modified forms of structure or use of mechanical equivalents, which may be reasonably included within their scope.

I claim as my invention:

1. A harrow draw bar consisting of a center member, a pair of end members, hinge connections for hingedly connecting the ends of said center member to said end members whereby said end members may be folded to overlap said center member, a pair of draw rods connected to said center member and end member at the hinge connection therebetween, braces secured to said end members and to said draw rods, braces secured to said center member and secured to said draw rods and means for permitting harrow sections to be secured to said center and end members as and for the purposes stated.

2. A harrow draw bar consisting of a center member, a pair of end members, hinge connections for hingedly connecting the ends of said center member to said end members, the center pins of said hinges forming draw rods, braces secured to said end members and to said draw rods, braces secured to said center member and secured to said draw rods and means for permitting harrow sections to be secured to said center and end members, said hinge connections comprising socket members secured to the center member and so constructed that said end members will be received therein and abut against the ends of said center member as and for the purposes stated.

3. A harrow draw bar consisting of a center member, a pair of end members, hinge connections for hingedly connecting the ends of said center member to said end members whereby said end members may be folded to a position overlapping said center member, a pair of draw rods connected to said center member and end member at the hinge connection therebetween, braces secured to said end members and to said draw rods and means for permitting harrow sections to be secured to said center and end members, said hinge connections comprising socket members secured to the center member and projected beyond the ends thereof, said end members being received in said socket members and abutting against the ends of said center member, the abutting ends of the center member and end members having notches therein for receiving the draw rods, as and for the purposes stated.

4. A harrow draw bar consisting of a center member and a pair of end members, plates secured to the ends of said center member, plates secured to one end of each of said end members, openings in said plates for the reception of draw rods, braces from said center member to the ends of said draw rods for bracing said draw rods and braces from said end members to the ends of said draw rods for bracing said end members, said draw rods forming hinge pins in said plates for the purpose of hinging said end members so that they may be folded to position overlapping said center member.

Des Moines, Iowa, March 18, 1924.

CHARLES STANEK.